(12) United States Patent
Menard et al.

(10) Patent No.: US 10,212,533 B2
(45) Date of Patent: Feb. 19, 2019

(54) METHOD AND SYSTEM FOR SYNCHRONIZING VIBRO-KINETIC EFFECTS TO A VIRTUAL REALITY SESSION

(71) Applicant: D-BOX TECHNOLOGIES INC, Longueuil (CA)

(72) Inventors: Jean-Francois Menard, Boucherville (CA); Francis Moreau, Longueuil (CA); Robert Desautels, Longueuil (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 0 days.

(21) Appl. No.: 15/776,456

(22) PCT Filed: Nov. 16, 2016

(86) PCT No.: PCT/US2016/062182
§ 371 (c)(1),
(2) Date: May 16, 2018

(87) PCT Pub. No.: WO2017/087460
PCT Pub. Date: May 26, 2017

(65) Prior Publication Data
US 2018/0332425 A1      Nov. 15, 2018

Related U.S. Application Data

(60) Provisional application No. 62/255,687, filed on Nov. 16, 2015.

(51) Int. Cl.
*H04S 7/00*         (2006.01)
*H04S 3/00*         (2006.01)
(Continued)

(52) U.S. Cl.
CPC .............. *H04S 7/304* (2013.01); *G06F 3/012* (2013.01); *H04L 67/38* (2013.01); *H04R 3/04* (2013.01);
(Continued)

(58) Field of Classification Search
CPC ........... G06F 3/012; H04L 67/38; H04R 3/04; H04R 5/02; H04R 2420/07; H04S 3/008;
(Continued)

(56) References Cited

U.S. PATENT DOCUMENTS

2001/0036868 A1   11/2001   Roy
2003/0235317 A1   12/2003   Baumgarte
(Continued)

FOREIGN PATENT DOCUMENTS

EP              2881945 A1        6/2015

OTHER PUBLICATIONS

International Search Report for corresponding application PCT/US2016/062182 filed Nov. 16, 2016; dated Jan. 24, 2017.
(Continued)

*Primary Examiner* — Mark Fischer
(74) *Attorney, Agent, or Firm* — Cantor Colburn LLP

(57) ABSTRACT

A method for synchronizing an output of a motion signal with a virtual reality program being played comprises mixing a multi-channel audio output of the virtual reality program into at least one mixed audio track. A time position of the virtual reality program being played is obtained using the at least one mixed audio track. A motion signal corresponding to virtual reality program being played and synchronized with the identified time position of the virtual reality program being played is obtained, the motion signal comprising motion platform actuator-driving instructions. The motion signal is output to an actuation system of a motion platform for producing vibro-kinetic effects in the
(Continued)

motion platform corresponding to and synchronized with the virtual reality program being played. A motion controller for synchronizing an output of a motion signal with a virtual reality program being played is also provided.

17 Claims, 3 Drawing Sheets

(51) Int. Cl.
    *H04R 3/04* (2006.01)
    *H04R 5/02* (2006.01)
    *G06F 3/01* (2006.01)
    *H04L 29/06* (2006.01)

(52) U.S. Cl.
    CPC ............... *H04R 5/02* (2013.01); *H04S 3/008* (2013.01); *H04R 2420/07* (2013.01); *H04S 2400/01* (2013.01); *H04S 2400/03* (2013.01); *H04S 2400/11* (2013.01)

(58) Field of Classification Search
    CPC .. H04S 7/304; H04S 2400/01; H04S 2400/03; H04S 2400/11
    See application file for complete search history.

(56) References Cited

U.S. PATENT DOCUMENTS

| | | |
|---|---|---|
| 2007/0236449 A1 | 10/2007 | Lacroix |
| 2009/0128306 A1 | 5/2009 | Luden |
| 2012/0019352 A1 | 1/2012 | Menard |
| 2014/0056461 A1 | 2/2014 | Afshar |
| 2015/0325027 A1 | 11/2015 | Herman |
| 2017/0180863 A1* | 6/2017 | Biggs ..................... B06B 1/045 |

OTHER PUBLICATIONS

Written Opinion for corresponding application PCT/US2016/062182 filed Nov. 16, 2016; dated Jan. 24, 2017.
European Search Report for corresponding application EP16866999; Reported dated Aug. 16, 2018.

* cited by examiner

METHOD AND SYSTEM FOR SYNCHRONIZING VIBRO-KINETIC EFFECTS TO A VIRTUAL REALITY SESSION

CROSS-REFERENCE TO RELATED APPLICATION

The present application claims the priority of U.S. Provisional Patent Application No. 62/255,687, filed on Nov. 16, 2015 and incorporated herein by reference.

FIELD OF THE APPLICATION

The present application relates to motion simulators performing vibro-kinetic effects in a virtual reality session.

BACKGROUND OF THE ART

Motion simulators performing vibro-kinetic effects are commonly used to enhance a viewing experience of a video program. In such technology, a motion simulator features a seat or platform that is displaced by actuators in vibro-kinetic effects in synchronization with an audio-visual program or visual event. In a particular type of such motion simulators, the motion simulators move based on motion signals that are encoded as a motion track, in contrast to vibrations being extracted from a soundtrack of an audio-visual program.

In a similar fashion, virtual reality is also used to enhance audio-visual experiences, by providing virtual environments in which a viewer is immersed. Mobile virtual reality may add additional effects to an audio-visual program. In mobile virtual reality, a user wears a head-mounted display and a headset. The head-mounted display or the headset feature an inertial measurement unit (IMU) in order to track movements of the user and therefore adapt the visual display as a function of the wearer's orientation in the virtual environment. In mobile virtual reality sessions, the audio output is also immersive, in that the audio output will be adapted to the user's orientation within the virtual environment. For example, the audio output may feature a left and a right channel with the audio output of the left and right channels being adjusted in real time as a function of the wearer's orientation in the virtual environment.

Considering that motion platforms often use the audio output to synchronize the motion signals to the audio-visual program, it is desirable to devise a method and a system for synchronizing movements of a motion platform with a mobile virtual reality session.

SUMMARY OF THE DISCLOSURE

Therefore, in accordance with a first embodiment of the present disclosure, there is provided a method for synchronizing an output of a motion signal with a virtual reality program being played, comprising: mixing a multi-channel audio output of the virtual reality program into at least one mixed audio track; obtaining a time position of the virtual reality program being played using the at least one mixed audio track; obtaining a motion signal corresponding to virtual reality program being played and synchronized with the identified time position of the virtual reality program being played, the motion signal comprising motion platform actuator-driving instructions; and outputting the motion signal to an actuation system of a motion platform for producing vibro-kinetic effects in the motion platform corresponding to and synchronized with the virtual reality program being played.

In accordance with the first embodiment, mixing a multi-channel audio output of the virtual reality program into a mixed audio track comprises in an instance mixing the multi-channel audio output into a monophonic audio signal.

Still in accordance with the first embodiment, mixing a multi-channel audio output of the virtual reality program comprises in an instance receiving the multi-channel audio output from a headphone jack of a mobile virtual reality processor.

Still in accordance with the first embodiment, mixing a multi-channel audio output of the virtual reality program comprises in an instance receiving the multi-channel audio output wirelessly from a transmission by the mobile virtual reality processor.

Still in accordance with the first embodiment, mixing a multi-channel audio output of the virtual reality program comprises in an instance using weighted-sum mixing in which $$M = w1*C1 + w2*C2 + \ldots + wn*Cn$$

wherein M is the mixed audio track, Cn are the channels and w are the weight.

Still in accordance with the first embodiment, mixing a multi-channel audio output of the virtual reality program comprises in an instance filtering human voices out.

Still in accordance with the first embodiment, mixing a multi-channel audio output of the virtual reality program comprises in an instance excluding at least some channels of the multi-channel audio output from the mixed audio track.

Still in accordance with the first embodiment, mixing a multi-channel audio output of the virtual reality program comprises in an instance mixing at least two mixed audio tracks, with each said at least two mixed audio track having an own mixing variation, wherein obtaining the time position, obtaining the motion signal and outputting the motion signal is performed using the at least two mixed audio tracks.

Still in accordance with the first embodiment, mixing at least two mixed audio tracks, with each said at least two mixed audio track having an own mixing variation, comprises in an instance mixing the at least two mixed audio tracks from different channel combinations of the multi-channel audio output.

Still in accordance with the first embodiment, obtaining the time position of the virtual reality program being played comprises in an instance obtaining the identity of the virtual reality program being played, and subsequently receiving the time position of the virtual reality program.

Still in accordance with the first embodiment, obtaining the time position of the virtual reality program being played comprises in an instance computing a fingerprint of the at least one mixed audio track.

Still in accordance with the first embodiment, computing the fingerprint comprises in an instance applying a fingerprinting technique to generate the fingerprint as a coded identifier uniquely representative of the mixed audio track at the time position.

Still in accordance with the first embodiment, obtaining the time position of the virtual reality program being played comprises in an instance consulting a database of reference fingerprints to which are associated time positions and retrieving the time position that corresponds to the computed fingerprint.

Still in accordance with the first embodiment, consulting the database of reference fingerprints comprises in an instance consulting the database of reference fingerprint on a remote networked server.

Still in accordance with the first embodiment, obtaining the time position comprises in an instance continuously obtaining the time position, obtaining the motion signal and outputting the motion signal, thereby ensuring continuous synchronization of the motion signal.

Still in accordance with the first embodiment, obtaining the motion signal associated with the time position comprises in an instance obtaining the motion signal from a remote networked server.

Still in accordance with the first embodiment, actuators of the motion platform are driven with the motion signal.

Still in accordance with the first embodiment, there is provided in an instance a non-transitory computer readable memory having recorded thereon statements and instructions for execution by a computer to carry out a method as described above for synchronizing an output of a motion signal corresponding to a virtual reality program being played, the motion signal for producing vibro-kinetic effects in a motion platform.

In accordance with a second embodiment of the present disclosure, there is provided a motion controller for synchronizing an output of a motion signal with a virtual reality program being played, comprising: an audio mixing module for mixing a multi-channel audio output of the virtual reality program into at least one mixed audio track; an identifier module for obtaining a time position of the virtual reality program being played using the at least one mixed audio track; and a motion providing module for obtaining a motion signal corresponding to the virtual reality program being played and synchronized with the identified time position of the virtual reality program being played, the motion signal comprising motion platform actuator-driving instructions, and for outputting the motion signal to an actuation system of a motion platform for producing vibro-kinetic movements corresponding to and synchronized with the virtual reality program being played.

In accordance with the second embodiment, the audio mixing module mixes in an instance the multi-channel audio output into a monophonic audio signal.

Still in accordance with the second embodiment, the audio mixing module receives in an instance the multi-channel audio output from a headphone jack of a mobile virtual reality processor.

Still in accordance with the second embodiment, the audio mixing module receives in an instance the multi-channel audio output wirelessly from a transmission by the mobile virtual reality processor.

Still in accordance with the second embodiment, the audio mixing module uses in an instance weighted-sum mixing in which $$M = w1*C1 + w2*C2 + \ldots + wn*Cn$$

wherein M is the mixed audio track, Cn are the channels and w is the weight.

Still in accordance with the second embodiment, the audio mixing module filters in an instance human voices out of the mixed audio output.

Still in accordance with the second embodiment, the audio mixing module excludes in an instance at least some channels of the multi-channel audio output from the at least one mixed audio track.

Still in accordance with the second embodiment, the audio mixing module mixes in an instance at least two mixed audio tracks, with each said at least two mixed audio track having an own mixing variation, wherein identifier module and the motion providing module use the at least two mixed audio tracks.

Still in accordance with the second embodiment, the audio mixing module mixes in an instance the at least two mixed audio tracks from different channel combinations of the multi-channel audio output.

Still in accordance with the second embodiment, the identifier module obtains in an instance the identity of the virtual reality program being played, and subsequently receives the time position of the virtual reality program.

Still in accordance with the second embodiment, the identifier module computes in an instance a fingerprint of the at least one mixed audio track.

Still in accordance with the second embodiment, the identifier module applies in an instance a fingerprinting technique to generate the fingerprint as a coded identifier uniquely representative of the mixed audio track at the time position.

Still in accordance with the second embodiment, the identifier module consults in an instance a database of reference fingerprints to which are associated time positions and retrieves the time position that corresponds to the computed fingerprint.

Still in accordance with the second embodiment, consulting the database of reference fingerprints comprises in an instance consulting the database of reference fingerprint locally.

Still in accordance with the second embodiment, the motion controller in an instance continuously obtains the time position, obtains the motion signal and outputs the motion signal, thereby ensuring continuous synchronization of the motion signal.

Still in accordance with the second embodiment, the motion providing module obtains in an instance the motion signal associated with the time position a remote networked server.

Still in accordance with the second embodiment, a driving module is provided in an instance for driving actuators of the motion platform with the motion signal.

DESCRIPTION OF THE EMBODIMENTS

Figure 1:
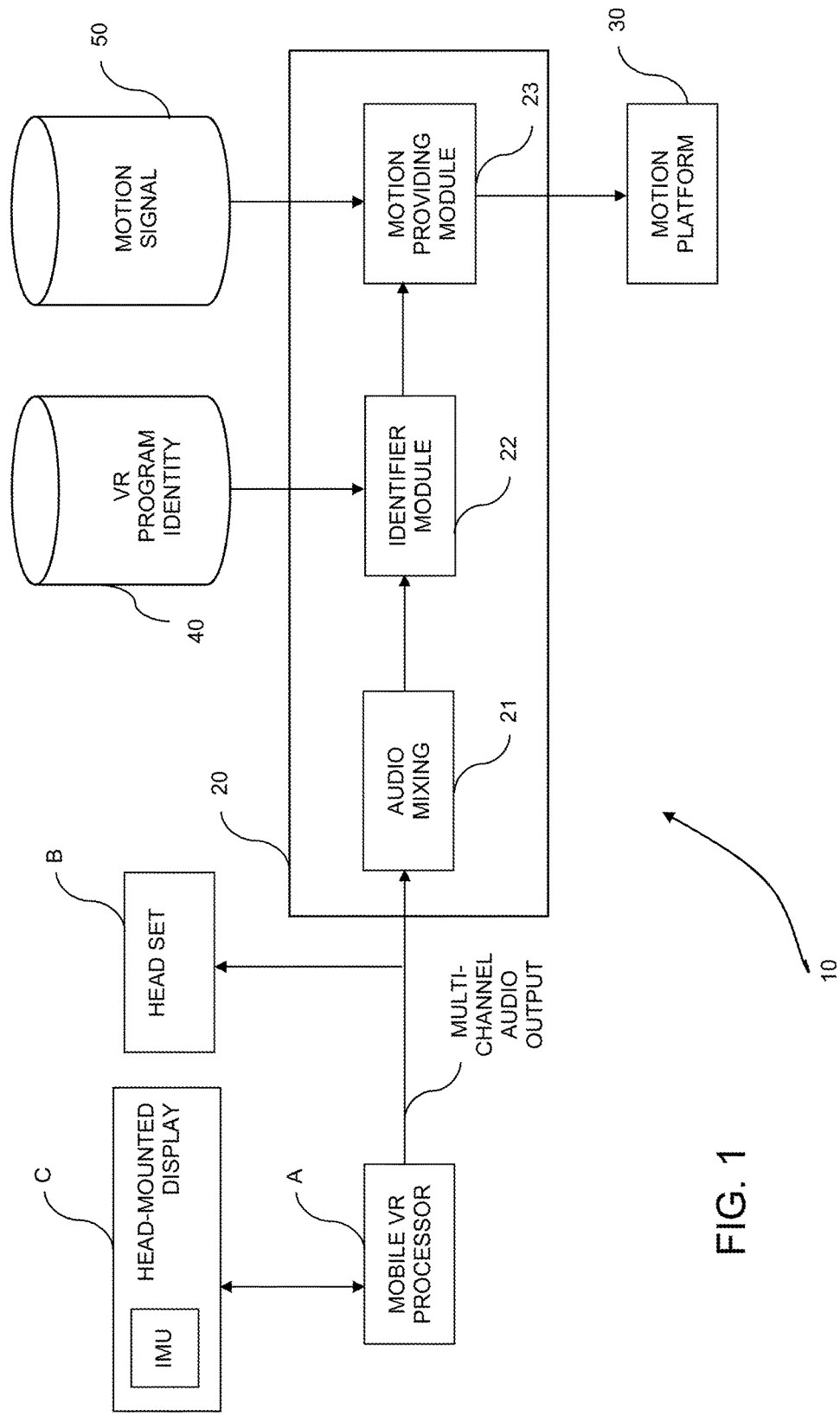
FIG. 1 is a schematic view of a system for synchronizing vibro-kinetic effects to a virtual reality session in accordance with the present disclosure.
Figure 3:
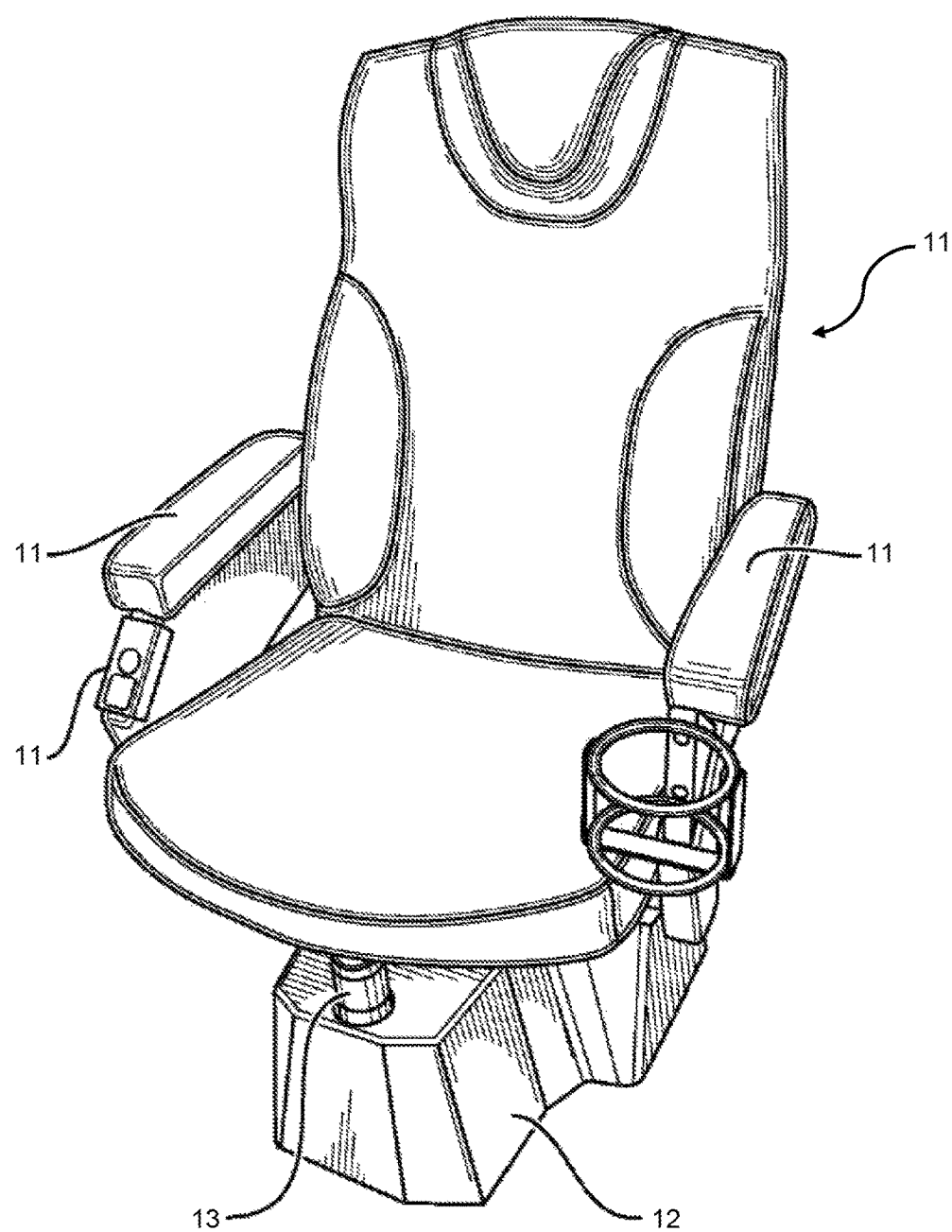
FIG. 3 is a perspective view of an embodiment of a motion platform that may be used in conjunction with the system of FIG. 1.

Referring to the drawings, and more particularly to FIGS. 1 and 3, there is illustrated at 10 a system for synchronizing vibro-kinetic effects of a motion platform(s) with a virtual reality session. By way of example, the motion platform receiving signals from the system 10 may include a motion simulator as shown in FIG. 3. The motion simulator is of the type that receives actuation signals so as to move an output thereof in accordance with a set of movements. For example, the motion simulator may be of the type that moves in synchronicity with video or audio output, with a motion signal representative of movements to be performed being received from a controller. In the illustrated embodiment, the motion simulator has a seat having a seat portion 11 in which a user(s) may be seated. Other occupant supporting structures may be included, such as a platform, but for simplicity the expression seat portion 11 will be used in the present application.

The seat portion 11 is shown as having armrests, a seat, and a backrest and this is one of numerous configurations considered, as the seat portion 11 could be for a single user, multiple users, may be a bench, etc. The motion simulator also has an actuation system 12 by which the output, namely the seat portion 11, is supported to the ground. The actuation system 12 is shown as having a casing hiding its various components, although a linear actuator 13 is partly visible. The actuation system may have one or more of these linear actuators 13, supporting the output, i.e., the seat portion 11, from the ground. In an embodiment, the linear actuator 13 is an electro-mechanical actuator of the type having a ball-screw system, although other types of linear actuators may be used. Alternatively, a hydraulic or pneumatic cylinder could be used in lieu of the electro-mechanical linear actuator 13, for the motion simulator of FIG. 3. The motion simulator of FIG. 3 is one among numerous possible configurations for the motion simulator. For example, the motion simulator may support a platform or structure instead of a seat portion, in a flight simulator embodiment, or an end effector in the case of a parallel manipulator or like robotic application. The motion simulator may include the necessary electronics to receive a digital signal with motion content to drive the actuation system 12 in performing movements in synchronization with an audio or video output or a virtual reality session, as described hereinafter.

For context, vibro-kinetic effects refers to vibrations and/or displacements performed by a motion platform and presented to a user as a sensory feedback. By way of non-limiting example, the vibro-kinetic effects may be low amplitude reciprocate movements or vibrations, from 1 micron to 200 mm, it may have a low frequency spectral content, such as 0-5 Hz, 20-100 Hz or 0-200 Hz, and may contain one or more dimension or channel. According to an embodiment, the vibro-kinetic effects are encoded effects.

The system 10 features a motion controller 20 feeding a motion platform 30 (e.g., the motion simulator of FIG. 3) with a motion signal representative of the vibro-kinetic effects to be performed by the motion platform 30. The motion platform 30 refers to a system comprising one or more actuators for rendering vibro-kinetic effects to a user. In addition to the example of FIG. 3, a motion platform can take various forms, such as a vibro-kinetic platform for lifting people relative to a structure, a motion platform supporting a seat, a chair with inertial shakers, a portable tactile display for providing haptic feedback, wearable actuators embedded in a vest, etc. Actuators can be of various types, such as linear, rotary, voice coil, resonant, inertial, and the like, and be powered from various source, such as electric (including electromechanical), pneumatic, hydraulic, etc. The motion signal is output from a motion program or motion track that is programmed based on a viewing of the audio-visual output, and comprises actuator-driving instructions to drive the actuators of the motion platform 30 to perform the programmed vibro-kinetic effects in audio-visual output. Other names for the motion signal may include vibro-kinetic signal, motion code, motion samples, data packets of motion, etc. The motion platform 30 may therefore have a digital signal processor and/or driver in order to convert the motion signal received from the motion controller 20 into signals controlling the movements performed by the actuators to displace the seat or platform of the motion platform 30.

The virtual reality (VR) session is produced by a mobile virtual reality processor A. The mobile VR processor A produces an immersive virtual environment by way of headphones B (also referred to as head set B) and head-mounted display C. The virtual environment has a surround video program or movie and an audio program or track. The mobile VR processor A or the head-mounted display are may be of the type featuring an inertial measurement unit (IMU) in order to track an orientation of the wearer in the virtual environment. In an embodiment, the VR processor A is an integral part of the head-mounted display C. The tracking of the orientation of the wearer may also be performed by way of an optical tracking system including a camera or like sensor tracking movements of the wearer. For example, the wearer and/or head-mounted display C may be equipped with trackable references that are tracked by camera to compute the orientation of the wearer. This may for instance be an alternative to the IMU. Using the output of the IMU or the tracking from a tracking system, the video output is adjusted based on the point of view (POV) of the wearer in the virtual environment. Likewise, because of the output of the IMU, the wearer receives in the headset B an audio output that is adjusted to the POV of the wearer in the virtual environment. Hence, the mobile VR processor A produces a multi-channel audio output for the headset B. According to an embodiment, the multi-channel audio output features a left and a right channel for stereophonic output. The headset B may have the form of ear-phones, head-phones, speaker-phones, and the like. According to an embodiment, the headset B is integral with the head-mounted display C, as a single piece of VR equipment.

The mobile VR processor A and head-mounted display C may be of any appropriate configuration. For example, the head-mounted display C may feature a head support with lenses supporting a mobile device, such as a smart phone, a tablet, a portable media player. The mobile device may therefore be the mobile VR processor A providing the processing capacity, the IMU to track orientation, and the screen to operate the virtual reality session. In such an embodiment, the headset B may be connected to the mobile VR processor A by way of a standard stereo audio connector (e.g., TRS connector) or any other type of multi-channel connector. Alternatively, the audio output may be received by the headset B using wireless technology, such as Bluetooth™ or wifi. The mobile VR processor A, whether in the form of a mobile device, laptop, desktop, etc, may provide a video output to a stand-alone head-mounted display C having its own screen.

The motion controller 20 performs the functions of identifying the VR audio-visual program (referred to as VR program for simplicity), and outputting a motion signal for the media in synchronization with the VR session, or driving the actuation system 12 with the motion signal. Accordingly, the motion controller 20 is a processor having the suitable processing capacity in order to perform these functions and may also have databases, telecommunications capacity and hardware in order to obtain VR program identity and related motion signal to output the motion signal to the motion platform 30.

The motion controller 20 comprises an audio mixing module 21 that receives the multi-channel audio output from the VR program. According to an embodiment, the motion controller 20 taps directly into the headset line to obtain the stereophonic audio output. According to another embodiment, the motion controller 20 may receive the audio output wirelessly. The audio mixing module 21 performs a mixing function in order to produce a recognizable audio track. According to an embodiment, the audio mixing module 21 successively combines sequence portions (i.e., sequence portions) of the various channels of the audio track into a monophonic channel. The audio mixing module 21 may be part of the mobile VR processor A, such that the motion controller A receives the mixed audio track.

Simple mixing techniques can be used such as analog addition by connecting channel wires together, with the optional use of resistors. More complex channel mixing techniques may be used, such as digital signal processing (DSP), weighted-sum and weighted-averaging. The following mathematical expression may represent one form of weighted-sum producing a mixed signal M from channels Cn and respective weights wn:

$$M = w1*C1 + w2*C2 + w3*C3 + w4*C4 + w5*C5 + w6*C6$$

The mathematical expression above can be adapted to suit more or less channels as needed. In one embodiment, the weights wn are decimal values comprised between −1 and +1, the negative values actually subtracting channels content. The weights wn can be static (constant throughout the process) or dynamic (updated between each audio sample or less often). The dynamic update of the weights can be based on various DSP techniques, such as channel filtering, envelope analysis and spectral analysis. Furthermore, various processing can be applied to the individual channels prior to mixing or after mixing, such as digital or analog filtering. In one embodiment, analog filtering is used to remove DC bias from input channels. In another embodiment, digital filtering is used to diminish the presence of human voice in the mixed output. According to another embodiment, the mixing module 21, produces multiple mixed audio tracks, one for each mixing variation. As a non-limiting example, the output can contain one additive mix, one subtractive mix, and one additive mix with human voices filtered out.

In another embodiment, the mixing unit 21 receives 6 input audio channels (in a 5.1 channel configuration) to produce a first mixed output averaging only Front-Left and Front-Right channels, a second mixed output averaging Front-Left, Front-Right and Front-Center channels, and a third mixed output of Front-Left and Front-Right channels with human voices filtered out.

An identifier module 22 uses the mixed audio track to obtain or identify a VR program time position. For example, using the mixed audio track, the identifier module 22 will be capable of identifying or obtaining the identity of the VR program and the time position of the VR program (e.g., at 00:02:37.12). According to an embodiment, the identifier module 22 identifies the VR program and its time position by creating a fingerprint of a sequence portion of the mixed audio track and comparing this fingerprint of the mixed audio track (i.e., a signature of the sequence portion of the mixed audio track) to a database of fingerprints of VR program audio tracks in a corresponding or compatible format. This is one of different approaches used by the identifier module 22 to identify the VR program time position. For example, U.S. Pat. No. 8,773,238, by the present Applicant and thus incorporated herein by reference, suggests different approaches to identify a media time position. The identifying may include identifying first the VR program, to then identify the time position. In such an arrangement, the identifier module 22 can perform a comparative search in a first coarse database to identify the VR program, and a comparative search in a second fine database to precisely find the ongoing time position of the identified VR program. For simplicity, the VR program identity database 40 is illustrated as a single database, although it may be different databases. The identifier module 22 may therefore produce different fingerprints, such as a coarse fingerprint and a fine fingerprint. In some instances, the VR program identity database 40 is of manageable size, such that the identifier module 22 does not need to identify the VR program as a first step, but may instead identify a fingerprint correspondence in a database of time position fingerprints of available VR programs while not impacting the real-time synchronization of the motion signal output with the ongoing VR session.

According to an embodiment, the identifier module 22 identifies the VR program and its time position by creating a fingerprint of a sequence portion of the mixed audio track by computing the fingerprint of the received portion of the mixed audio track. In computing the fingerprint, the fingerprint of the mixed audio track may be generated as a code that uniquely corresponds to a waveform of the mixed audio track. Stated differently, the identifier module 22 may apply a fingerprinting technique to generate the fingerprint as a coded identifier uniquely representative of the mixed audio track at the time position. Upon generating such a unique code (i.e., a coded identifier), the corresponding waveform of the mixed audio signal from which the fingerprint was generated is identifiable by comparison with reference fingerprints in the VR program identity database 40. Alternatively, obtaining the fingerprint may consist of retrieving the coded identifier for the fingerprint of the portion of the mixed audio track at the reference time position directly from the motion signal. In accordance with another embodiment, the identifier module 22 sends segments of the mixed audio track to the VR program identity database 40, in which the identifying (e.g., creating of fingerprint, comparison, etc) will be performed, with the identifier module 22 obtaining the identity and the time position of the VR program.

For sizable databases, the system 10 may use different approaches to accelerate the identifying step. According to another embodiment, the VR program identity search may be performed in a reduced portion of a database, to narrow the search and potentially accelerate the identification process. For example, users of vibro-kinetic effects have a tendency to watch audio-visual programs from the beginning. Therefore, the program identity search may be narrowed by filtering in the first few seconds or minutes of the audio-visual programs. Upon identifying the audio-visual program in this coarse manner, the system 10 may then proceed with the fine identification of the time portion in the identified program.

Similarly, in another embodiment, the VR program identity database comprises a first database which relates to the first few seconds or minutes of every audio-visual program available to a user, and a second database which relates to the entire content of every audio-visual program available to a user, where both databases are looked up in an attempt to identify a playing audio-visual program. The first database being smaller, its lookup may succeed faster, but only within the first few seconds or minutes of the program. In the event that the first one fails to find a match, the lookup in the second database may eventually succeed, after additional computing time given its extra size.

As another example, the narrowing of the search by the system 10 may use the time as a filter parameter. Indeed, as television networks (in contrast to on-demand services) tend to start programs on the hour, or on the half-hour, the search may take into account the clock time to narrow the identity search, to search for example programs 15 minutes in (e.g., plus or minus 5 minutes) when the search is initiated at 7:15 pm or 7:45 pm.

According to another embodiment, the identifier module 22 uses multiple mixed outputs from the mixing module 21 for multiple identifications. The multiple identifications can be done sequentially (one after the other) or concurrently (at the same time). The results from each of the multiple identifications are then combined using an algorithm that returns a single time position. Non-limiting example of such algorithm include keeping the time position from the media that was most played based on past statistics. In one embodiment, the identifier module 22 concurrently looks up a first database related to a mix of Front-Left and Front-Right channels, a second database related to a mix of Front-Left, Front-Right and Front-Center channels, and a third database related to a mix of Front-Left and Front-Right channels with human voices filtered out.

The above-described search narrowing strategies by the system 10 are not limited to application in VR programs, but may also be applicable to movies, television shows, etc, in domestic, theatrical and/or commercial settings. Likewise, the audio mixing described herein is not limited to application in VR programs.

The database 40 may be part of the motion controller 20 or may be a separate cloud database in the manner illustrated in FIG. 1. Accordingly, the motion controller 20 may use its telecommunication capacity in order to access the VR program identity database 40. The fingerprints populating the database 40 are created in pre-programming using the mixed audio track of the VR program, or an equivalent thereof, to ensure correspondence between the fingerprints of the identifier module 22 and those populating the VR program identity database 40. Moreover, as mentioned above, the database 40 may include fingerprint comparative searching capacity, such that the identifier module 22 is tasked with creating fingerprints from the mixed audio track, with communication with the comparative search service, and obtaining the time position corresponding to the fingerprint.

Once the VR program time position has been identified from the mixed audio track, a motion providing module 23 will provide a motion signal corresponding to the unique time position, and thus synchronized with the virtual reality program. The motion providing module 23 may access a motion signal database 50 that may be part of the motion controller 20 or may be a stand-alone database, for instance as part of the cloud. For example, the VR program identity database 40 and the motion signal database 50 may or may not be combined into a single database. The motion controller 20 may also include a driving module driving the actuators of the motion platform.

The motion providing module 23, having obtained the motion signal corresponding to the VR program time position, outputs the motion signal to the actuation system of the motion platform 30. The operations of the motion controller 20 are performed at a speed enabling the actuation of the motion platform 30 to be synchronized with the VR session, whereby the motion rendering is in real time or quasi-real time. Moreover, the motion rendering could be performed at a speed higher than real time in order to fill a motion buffer that will be unfilled at a regular pace toward the motion platform 30. This buffering may be used to compensate for timing irregularities in the motion processing, such as CPU interruptions or communication delays with the cloud. A non-limiting example of such buffer may be a jitter buffer or a resampling buffer.

By way of example, the motion controller 20 may be part of a stand-alone unit (dedicated hardware, PC, tablet, etc), may be integrated to the motion simulator (FIG. 3), or may be a module that is part of the mobile device A.

Figure 2:
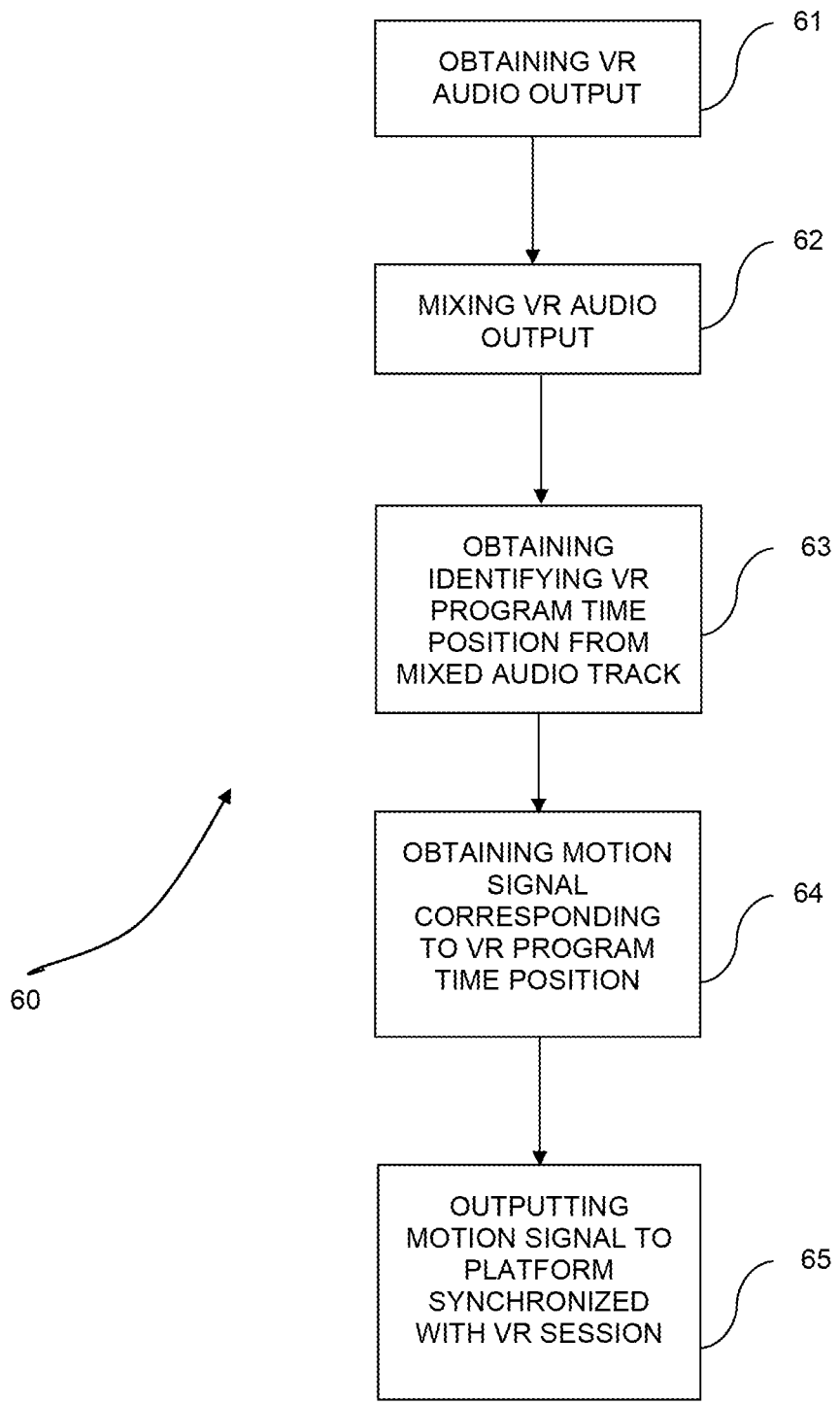
FIG. 2 is a flowchart of a method for synchronizing vibro-kinetic effects to a virtual reality session.

Referring to FIG. 2, a method for synchronizing vibrokinetic effects with a virtual reality session is shown at 60. The method 60 may be implemented using the system 10 of FIG. 1 with the VR setting described, using one or more processors of a computer system, although other systems and arrangements may also be used. At least some of the steps of the method 60 may be part of a non-transitory computer readable memory (not shown) having recorded thereon statements and instructions for execution by a computer to carry out a method for synchronizing an output of a motion signal with a virtual reality program being played.

According to 61, the VR audio output is obtained. In an embodiment, this includes all channels of a multi-channel audio output.

In 62, the multi-channel VR audio output is mixed. According to an embodiment, the multi-channels are combined into a single monophonic channel. In an embodiment, the mixing of the multi-channel VR audio output as in 62 may occur before the VR audio output is obtained (as a mixed audio track). Simple mixing techniques can be used such as analog addition by connecting channel wires together with the optional use of resistors. Other channel mixing techniques may be used, such as digital signal processing (DSP), weighted-sum and weighted-averaging. The following mathematical expression may represent one form of weighted-sum producing a mixed signal M from channels Cn and respective weights wn:

$$M=w1*C1+w2*C2+w3*C3+w4*C4+w5*C5+w6*C6$$

The mathematical expression above can be adapted to suit more or less channels as needed. In one embodiment, the weights wn are decimal values comprised between −1 and +1, the negative values actually subtracting channel content. The weights wn can be static (constant throughout the process) or dynamic (updated between each audio sample or less often). The dynamic update of the weights can be based on various DSP techniques, such as channel filtering, envelope analysis and spectral analysis. Furthermore, various processing can be applied to the individual channels prior to mixing or after mixing, such as digital or analog filtering. In one embodiment, analog filtering is used to remove DC bias from input channels. In another embodiment, digital filtering is used to diminish the presence of human voice in the mixed output.

According to 63, a VR program time position is obtained or identified from the mixed audio track. This may be done in a single step or in multiple substeps. Obtaining and/or identifying the VR program time position may include creating a fingerprint for the sequence portion of the mixed audio track, communicating the fingerprint or sequence portion of the mixed audio track to a search engine of a remote database, and/or comparing remotely or locally the fingerprint or sequence portion of the mixed audio track with a database of VR programs to identify the VR program and its time position. Some of these actions may be done in a single step or in multiple substeps, for instance depending on the size of VR program identity database and the processing capacity.

According to 64, upon identifying the VR program time position, a motion signal corresponding to the VR program time position is obtained, for the ongoing time position of the played VR program. The steps 63 and 64 can be combined in such a way that obtaining the intermediate time position as a separate step is optional. In such combination a single database can be used to lookup the fingerprint (the fingerprint intrinsically representing a time position) and obtain the motion signal.

According to 65, the motion signal is then output to an actuation system of a motion platform. This may include driving actuators of the motion platform if the driver is integrated into the motion controller 20. When these steps are performed in real time, the outputting of the motion signals is synchronized with an ongoing the virtual reality session. When one or more motion buffers are used, time position information from the motion platform output can be compared to time position information from the VR program in order to synchronize the motion signal with the VR program. Such synchronization may require adjusting the buffer unfilling pace or resampling the motion signal to adjust motion output speed. The motion signal will then be used to actuate vibro-kinetic effects of a motion platform with the VR session.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present disclosure.

Modifications and improvements to the above-described embodiments of the present invention may become apparent to those skilled in the art. For example, the disclosure refers to an audio output in generic terms, but the expression may cover successive sequence portions of the audio track. The foregoing description is intended to be exemplary rather than limiting. The scope of the present invention is therefore intended to be limited solely by the scope of the appended claims.

The invention claimed is:

1. A motion controller for synchronizing an output of a motion signal with a virtual reality program being played, comprising:
   an audio mixing module for mixing a multi-channel audio output of the virtual reality program into at least one mixed audio track;
   an identifier module for obtaining a time position of the virtual reality program being played using the at least one mixed audio track; and
   a motion providing module for obtaining a motion signal corresponding to the virtual reality program being played and synchronized with the identified time position of the virtual reality program being played, the motion signal comprising motion platform actuator-driving instructions, and for outputting the motion signal to an actuation system of a motion platform for producing vibro-kinetic movements corresponding to and synchronized with the virtual reality program being played.

2. The motion controller according to claim 1, wherein the audio mixing module mixes the multi-channel audio output into a monophonic audio signal.

3. The motion controller according to claim 1, wherein the audio mixing module receives the multi-channel audio output from a headphone jack of a mobile virtual reality processor.

4. The motion controller according to claim 1, wherein the audio mixing module receives the multi-channel audio output wirelessly from a transmission by the mobile virtual reality processor.

5. The motion controller according to claim 1, wherein the audio mixing module uses weighted-sum mixing in which $$M = w1*C1 + w2*C2 + \ldots + wn*Cn$$

wherein M is the mixed audio track, Cn are the channels and w is the weight.

6. The motion controller according to claim 1, wherein the audio mixing module filters human voices out of the mixed audio output.

7. The motion controller according to claim 1, wherein the audio mixing module excludes at least some channels of the multi-channel audio output from the at least one mixed audio track.

8. The motion controller according to claim 1, wherein the audio mixing module mixes at least two mixed audio tracks, with each said at least two mixed audio track having an own mixing variation, wherein identifier module and the motion providing module use the at least two mixed audio tracks.

9. The motion controller according to claim 8, wherein the audio mixing module mixes the at least two mixed audio tracks from different channel combinations of the multi-channel audio output.

10. The motion controller according to claim 1, wherein the identifier module obtains the identity of the virtual reality program being played, and subsequently receives the time position of the virtual reality program.

11. The motion controller according to claim 1, wherein the identifier module computes a fingerprint of the at least one mixed audio track.

12. The motion controller according to claim 11, wherein the identifier module applies a fingerprinting technique to generate the fingerprint as a coded identifier uniquely representative of the mixed audio track at the time position.

13. The motion controller according to claim 11, wherein the identifier module consults a database of reference fingerprints to which are associated time positions and retrieves the time position that corresponds to the computed fingerprint.

14. The motion controller according to claim 13, wherein consulting the database of reference fingerprints comprises consulting the database of reference fingerprint locally.

15. The motion controller according to claim 1, wherein the motion controller continuously obtains the time position, obtains the motion signal and outputs the motion signal, thereby ensuring continuous synchronization of the motion signal.

16. The motion controller according to claim 1, wherein the motion providing module obtains the motion signal associated with the time position a remote networked server.

17. The motion controller according to claim 1, further comprising a driving module for driving actuators of the motion platform with the motion signal.

* * * * *